United States Patent [19]

Backu

[11] Patent Number: 4,881,607
[45] Date of Patent: Nov. 21, 1989

[54] PLATFORM SCALE

[75] Inventor: Konrad Backu, Albstadt-Ebingen, Fed. Rep. of Germany

[73] Assignee: August Sauter GmbH, Albstadt-Ebinge, Fed. Rep. of Germany

[21] Appl. No.: 321,863

[22] Filed: Mar. 10, 1989

[30] Foreign Application Priority Data

Mar. 11, 1988 [DE] Fed. Rep. of Germany ....... 3808232

[51] Int. Cl.$^4$ ...................... G01G 21/08; G01G 21/10
[52] U.S. Cl. ..................................... 177/256; 177/187; 177/DIG. 9
[58] Field of Search .......... 177/187, 188, 256, DIG. 9

[56] References Cited

U.S. PATENT DOCUMENTS

| 3,658,143 | 4/1972 | Schwartz | 177/187 X |
| 4,189,018 | 2/1980 | Brouwer | 177/256 |
| 4,546,838 | 10/1985 | Ormond | 177/211 |
| 4,653,599 | 3/1987 | Johnson | 177/211 |

FOREIGN PATENT DOCUMENTS 3243350 9/1984 Fed. Rep. of Germany .
3439325 5/1985 Fed. Rep. of Germany .
3514340 10/1986 Fed. Rep. of Germany .
3619182 3/1988 Fed. Rep. of Germany .
638310 9/1983 Sweden .

Primary Examiner—George H. Miller, Jr.
Attorney, Agent, or Firm—Fleit, Jacobson, Cohn, Price, Holman & Stern

[57] ABSTRACT

A platform scale with a load platform (7) for receiving articles to be weighed, wherein the load is transmitted to a force sensor by force-transmitting arms (5), and is supported at each of its four corners by a respective single-piece force-transmitting member (2) via a respective load-bearing column (8). Force-transmitting member (2) comprises a fixedly disposed anchoring member (22), a load-bearing member (12) guided for parallel movement with respect to the anchoring member (22) by link members (10, 17), and a lever member (14) suspended between anchoring member (22) and load-bearing member (12) by two thin strips (13, 15) whereby the fulcrum of the lever member is formed by a thin strip (13), and lever member (14) transmits a torque, corresponding to the load, to force-transmitting arm (5).

20 Claims, 2 Drawing Sheets

PLATFORM SCALE

BACKGROUND OF THE INVENTION

1. Field of the Invention

The invention relates to a platform scale with a load platform for receiving the article to be weighed, a force sensor for generating a measuring signal related to the weight of the article to be weighed, and a lever arrangement supported on a basic frame which is rectangular in the frame plane, which plane is parallel to the plane of the load platform, wherein on the input side of the scale the load platform is supported vertically on the lever arrangement, for transmitting the force corresponding to the weight of the article to be weighed, and on the output side the lever arrangement is coupled to the force sensor by at least one force-transmitting arm.

2. Description of the Prior Art

In such platform scales, which customarily have two oppositely disposed force-transmitting arms, each one of which essentially transmits the force from one half of the load platform, wherein the arms are coupled together and are coupled in common to the force sensor via their mutually facing free ends, the lever arrangement is customarily complex in design. Because the lever arrangement is intended to receive the force to be transmitted to the force sensor, and also serves to guide the load platform, known platform scales have knife edges (thrust edges) and seats therefor, for accommodating and limiting individual parts, and such scales also may have means to prevent disengagement of the seats. Not only is such a system tedious to assemble and install, but also it requires very precise adjustment. As a result the adjustment costs are high.

A known scale of the type described initially above (Ger. OS 35 14 340) is improved in that the two force-transmitting arms are pivotably connected to the basic frame by means of flexional bearings, with each such bearing being comprised of a spring steel strip held between claw beams. This system is also costly to manufacture, install and adjust. Also, this known platform scale requires stable intermediate support on which the load platform is vertically supported and which is suspended on the force-transmitting arms. In addition, a horizontally extending link rod is required for lateral guiding of this intermediate support.

BRIEF SUMMARY OF THE INVENTION

An object of the present invention is to provide a platform scale of the type described initially above but wherein the number of individual parts required is reduced, and the cost of assembly, installation, and adjustment is reduced.

This objective is achieved according to the invention in that the lever arrangement has four single-piece force-transmitting members disposed respectively in the four corner regions of the basic frame and on two opposite lateral sides of the frame, wherein in each of the force-transmitting members there is provided an anchoring member affixed to the respective lateral side of the basic frame, and a load-bearing member which supports the load platform and extends at a horizontal distance from the anchoring member. The load-bearing member is parallelly guided by two link members disposed at a vertical distance apart and connected to the anchoring member and the load-bearing member by means of thin loci or strips of the single-piece force-transmitting member which thin strips are disposed at the corners of a parallelogram, and a lever member is disposed in the free inner space of each of the force-transmitting members, which inner space is bounded by and between the anchoring member, the load-bearing member, and the link members, wherein the lever member is connected by two additional thin loci or strips to the anchoring member and the load-bearing member, respectively. The lever members of the two force-transmitting members disposed on a given side of the frame are rotationally rigidly coupled together by a respective connecting member which extends along and close to the side of the frame. Each of the two connecting members has rigidly connected to it a force-transmitting arm which extends out from the connecting member and to the force sensor.

Thus, according to the invention, the only individual parts which are required for transmission of forces from the load platform to the two force-transmitting arms leading to the force sensor are the four identical single-piece force-transmitting members, and these present no difficulties in manufacturing, installation, and adjustment. The force components from the load platform acting on the load-bearing member, which load-bearing member is vertically parallelly guided by the link members, thus produce a vertical downward deflection of the load-bearing member which deflection is dependent on the elasticity of the thin strips of the link members. This displacement between the load-bearing member and the anchoring member leads to a lowering of the thin strips which connects the lever member to the load-bearing member, resulting in a rotation of the lever member around the thin strip which connects the lever member to the fixed anchoring member and acts as a fulcrum. The mechanical ratio which prevails between the force-transmitting arm and the lever member is thus precisely determined by the distance between the two thin strips which effect the suspension of the lever member in the single-piece force-transmitting member, and by the length of the force-transmitting arm with reference to the fulcrum of the lever. The inventive platform scale does not require an intermediate support, because the load platform can rest directly on the four load-bearing members. Only the vertical force components acting on the respective load-bearing member come to influence the rotational displacement of the lever member, because the transverse components are absorbed or countered by the link members and therefore exert no torque. Thus, according to the invention the load platform is supported on one of the force-transmitting members in the region of each of the platform's four corners, with the force-transmitting members being rotationally rigidly interconnected in pairs by the connecting members, whereby the common torque of their lever members is transmitted to the associated force-transmitting arm. The platform scale of the invention is thus distinguished by its small number of individual parts, and it has a very robust structure.

In a preferred embodiment of the inventive platform scale it is provided that the direction of weakening, e.g., decrease in thickness, of the material of the force-transmitting member at the thin strips which connect the lever member to the anchoring member and load-bearing member, respectively, is horizontal. By virtue of this configuration, the thin strips act similarly to bending members formed by vertical sheet springs with spring planes oriented perpendicularly to the plane of rotation of the lever member, i.e. the thin strips are vertically rigid and are elastic only horizontally.

In a refinement of the inventive platform scale it is provided that the force-transmitting member has a load-receiving arm the free end of which projects out from the load-bearing member to a point which is separated by a distance from the anchoring member, wherein the load platform is supported on the load-receiving arm. By virtue of this configuration, wherein the load-receiving arm is a single piece which extends from the load-bearing member parallel to the link members in the direction of the anchoring member, it is possible to accurately adjust the desired relation between the position of the point of vertical force application from the load platform to the load-bearing member, and the position of the fulcrum of the lever member determined by the thin strip which serves to provide such fulcrum.

According to another refinement of the invention, the anchoring member and/or the load-bearing member has a slot extending over most of its horizontal extent, and an adjusting device is provided to adjust the vertical width of the horizontal slot. By changing the width of this slot, the position of the thin strips which form the corners of the aforesaid parallelogram can be changed, whereby an additional torque is applied to the force-transmitting member, which torque is a function of the transmitted measurement force. Thereby, the same effect is produced as if the mechanical ratio of the apparatus were changed by other means, i.e. by changing the geometric distance between the thin strips in the second set, viz., between:

the thin strip connecting the lever member to the anchoring member, and the thin strip connecting the lever member to the load-bearing member.

Manufacturing tolerances which effect this mechanical ratio can be compensated for with the use of the adjusting device.

In this connection, it is advantageously provided that the slot in the load-bearing member starts in the free interior space near the thin strip of the vertically upper link member. When the load platform is removed, the slot is then readily accessible for adjusting purposes.

Structural simplification and ready accessibility are provided in another embodiment of the invention, according to which the adjusting device is comprised of a screw the head of which is supported against one side member adjacent the slot and the thread of which is engaged on the other side of the slot. The adjusting device is further comprised of a locking screw which is screwed into a thread on one side of the slot and abuts the opposing side of the slot.

Also within the scope of the invention is a feature whereby a foot piece is screwed into each anchoring member from the underside thereof for supporting the platform scale on a foundation. With this feature, the force-transmitting member rigidly affixed to the basic frame serves to support the platform scale on a foundation in such a way that the height of the force-transmitting member over the foundation is precisely adjustable. In particular, it is possible to adjust the height to the extent that the screwing height of the foot piece into the anchoring member can be adjusted.

Assembly of the platform scale is simplified if each anchoring member has two threaded bores disposed a vertical distance apart, whereby the anchoring member can be affixed to the basic frame with the use of two screws which pass through bores in the frame.

Finally, a particularly advantageous structural simplification can be achieved if the connecting member is in the form of a tube which is fastened in a form-interlocking bore of the associated lever member. This fastening of the connecting member to the lever may also be accomplished, e.g., by simple welding or adhesive bonding.

BRIEF DESCRIPTION OF THE DRAWINGS

Additional features, details, and advantages of the invention will be apparent from the following detailed description with reference to the accompanying drawings, all features of the drawings not expressly mentioned in the text being incorporated herein by reference for purposes of disclosure of the invention, wherein:

FIG. 2 is a top plan view of the platform scale of

Figure 1:
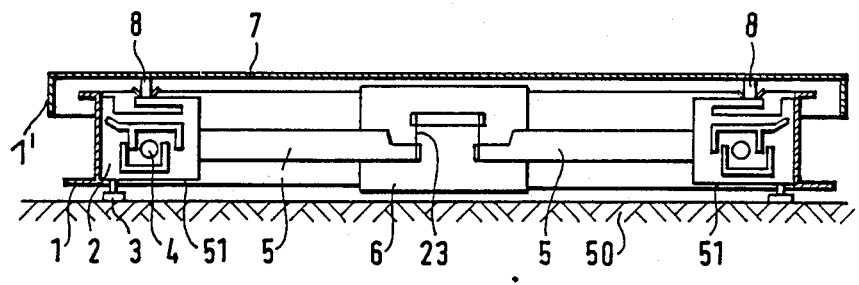
FIG. 1 is a vertical cross-sectional view taken along line I—I of FIG. 2 of a platform scale according to the invention.

DETAILED DESCRIPTION FIG. 1, with the load platform removed; and

Figure 3:
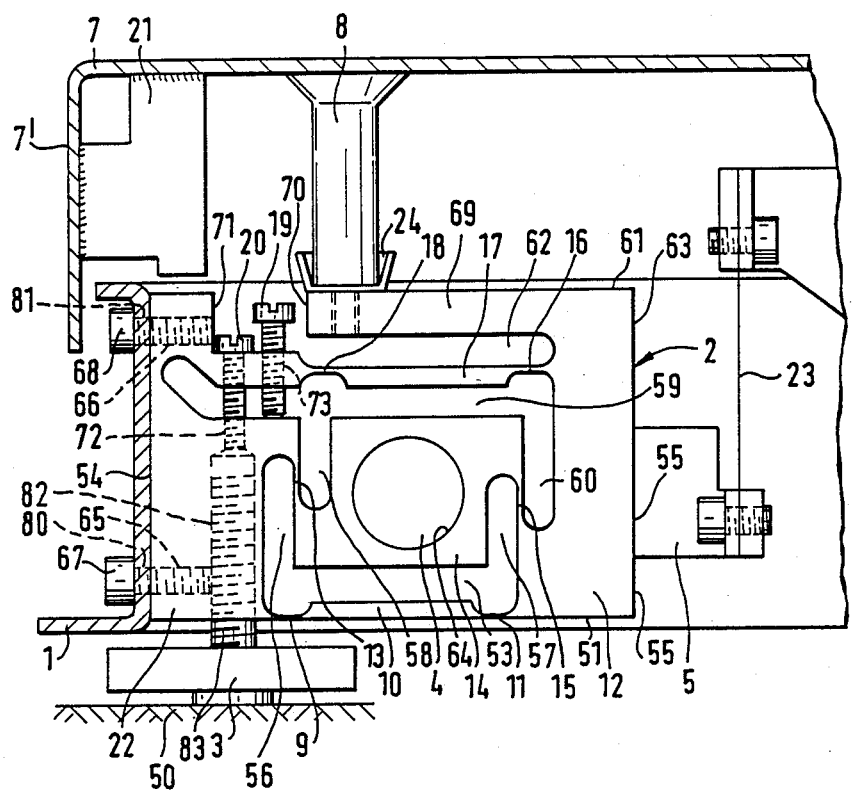

FIG. 3 is an enlarged detailed view of part of FIG. 1 showing a single-piece force-transmitting member.

Figure 2:
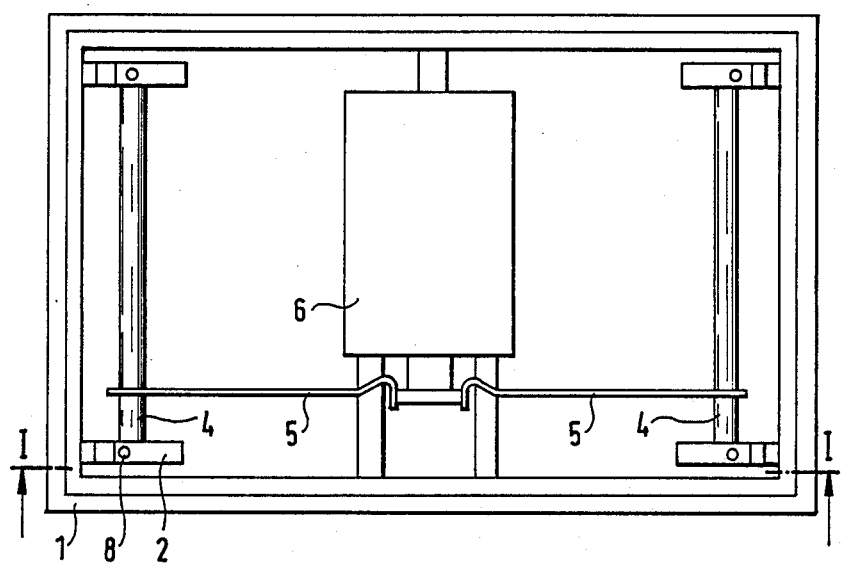

As seen from FIGS. 1 and 2, a platform scale according to the invention has a rectangular basic frame 1 having a level horizontal rectangular area. Frame 1 is disposed above a foundation 50 at a distance from said foundation determined by feet 3. On the interior sides of each of the two shorter sides of the rectangle of the basic frame 1, in the region of each respective corner of the rectangle, a respective single-piece force-transmitting member 2 is fixedly mounted. A rectangular, planar load platform 7 having dimensions coordinated with the basic frame 1, and having a perpendicularly downwardly bent edge 7' which overlaps the basic frame 1 at a short distance to the side thereof, is supported on the upper sides of the four respective force-transmitting members 2 by means of four load columns 8 which extend vertically downwardly from the underside of the load platform 7.

As will be described in detail below with reference to FIG. 3, the force-transmitting members 2 are components of a lever arrangement whereby, as a result of the force exerted by the load platform 7 (bearing the article to be weighed) on a given force-transmitting member 2, a torque is produced which acts on a respective connecting member 4 which joins a respective pair of force-transmitting members 2 disposed on the shorter lateral edges of the rectangular basic frame 1. The lever arrangement further has two force-transmitting arms 5 extending along the respective longer lateral edges of the basic frame 1, each arm 5 having one end rigidly affixed to the associated connecting member 4 and having its opposite, free end directed toward its companion arm 5 and extending to a coupling device 23 disposed in the middle of the longer dimension of the rectangle of basic frame 1. Device 23 couples the arms 5 together and connects them to a force sensor 6.

Due to the symmetrical arrangement of the force-transmitting members 2, connecting members 4, and force-transmitting arms 5, nearly all of the resultant torque is transmitted to the force sensor 6 via the arm 5 on the left (in FIGS. 1 and 2) when the article to be weighed is deposited on the left side of the load platform 7. When the article to be weighed is deposited on the right side of the load platform 7, nearly all the torque is transmitted by the right force-transmitting arm 5. If the article to be weighed is deposited in the middle, each arm 5 transmits approximately half of the total torque produced.

As seen particularly well from FIG. 3, the force-transmitting member 2 is fabricated from a single-piece, flat, rectangular plate. Near the lower edge 51 of force-transmitting member 2, which edge (when the system is in the unloaded state) is horizontal and parallel to the load platform 7, there is a first horizontal slot 53 which extends on the left to a locus which is at a distance from the left outer edge 54 (FIG. 3), and extends on the right to a locus which is at a distance from the right outer edge 55 of the force-transmitting member 2. A first left vertical slot 56, parallel to the left outer edge 54 and right outer edge 55, represents a vertically directed extension of the left end of slot 53, and there is a corresponding first right vertical slot 57 on the right, whereby a slot configuration in the form of a "U" is produced in the rectangular plate 2. The left leg of the "U", represented by the first left vertical slot 56, extends approximately to the midpoint of the height of the force-transmitting member 2, whereas the right leg of the "U", connected to the left leg by the first horizontal slot 53 which forms the connecting segment of the "U", which right leg is represented by the first right vertical slot 57, has a vertical height which is slightly less than that of the left leg of the "U".

A second U-shaped slot configuration similar to that formed by the first left vertical slot 56 and first right vertical slot 57, but having the free ends of the legs of the "U" directed downwardly, is formed by a second left vertical slot 58, a second horizontal slot 59 extending rightwardly from slot 58, and a second right vertical slot 60 which extends vertically downwardly from the right end of slot 59. A third horizontal slot 62 extends parallel to second horizontal slot 59 and between the upper edge 61 of the force-transmitting member 2, which edge 61 is parallel to the lower edge 51 of member 2, and horizontal slot 59. The thickness of the material of the force-transmitting member 2, which remains between the third horizontal slot 62 and the second horizontal slot 59 corresponds to the thickness of the material remaining between the lower edge 51 and the first horizontal slot 53. Thus, there are formed two parallel elongated link members 10 and 17, link member 10 being disposed between the lower edge 51 and the first horizontal slot 53, and link member 17 being disposed between the second horizontal slot 59 and the third horizontal slot 62. The ends of these link members lie on the corners of a parallelogram. These ends are in the form of thin strips 9, 11, 16, and 18, due to the fact that the horizontal slot 53 at the location of its corresponding thin strips is widened toward the lower edge 51, and the horizontal slot 59 is widened toward the third horizontal slot 62, wherein the widening occurs in a rounded transition region. The material of the link members 10 and 17 adjoining the wide regions of these slots, namely disposed toward the lower edge 51 and toward the third horizontal slot 62, respectively, is thereby in the form of a sheet spring.

The thin strips 9 and 18 (FIG. 3) connect the link members 10 and 17 to a vertically extending anchoring member 22 which is bounded on one side by the left outer edge 54 of the force-transmitting member 2 and on the other side essentially by the left edges of the vertical slots 56 and 58. On the right side, link members 10 and 17 are connected via the load-bearing member 12 which is bounded on the right by the right outer edge 63 of member 2 which is parallel to the left outer edge, and on the left by the right edges of the first right vertical slot 57 and the second right vertical slot 60. Thus, the load-bearing member 12 is maintained vertically parallel to the anchoring member 22 by the link members 10 and 17.

A specific segment of the left edge of the second left vertical slot 58 extends close to the right edge of the first left vertical slot 56, and similarly the right edge of the first right vertical slot 57 extends alongside of and close to the left edge of the second right vertical slot 60, so that there are additional thin strips 13 and 15, with strip 13 being delimited by and between the second left vertical slot 58 and first left vertical slot 56, and strip 15 being delimited by and between the first right vertical slot 57 and second right vertical slot 60. These thin strips (13, 15) thus act as sheet spring members with vertical spring planes, extending between the rounded ends of the overlapping legs of the first upwardly opening U-shaped slot configuration and the second downwardly opening U-shaped slot configuration. These thin strips 13, 15 suspend a lever member 14 in the force-transmitting member 2, said lever member 14 being bounded by and between the legs and cross members of the two U-shaped slot configurations. Member 14 is directly linked to the anchoring member 22 via thin strip 13, and to the load-bearing member 12 via thin strip 15.

The connecting member 4, discussed above with reference to FIGS. 1 and 2, has a tubular shape, and is welded into a central hole 64 of the lever member 14.

Two threaded bores 65, 66 extending into the anchoring member 22 from its left outer edge 54 serve to receive two screws 67, 68 for fastening the anchoring member 22 to the inner side of the basic frame 1. These screws 67, 68 extend through bores 80, 81 in the basic frame 1. Another threaded bore 82, extending into the anchoring member 22 from the lower edge 51, serves to receive the threaded shaft 83 of foot part 3, which by virtue of this threaded engagement, serves as an adjustable foot for vertical adjustment above the foundation 50.

The second horizontal slot 59 extends farther leftward into the anchoring member 22 in the region thereof beyond the second left vertical slot 58, extending substantially horizontally beyond the middle of the horizontal extent of the anchoring member 22 and then at an angle upwardly until a position close to the left outer edge 54 is reached. A load-receiving arm 69 of the load-bearing member 12 is delimited by and between the upper edge 61 of the force-transmitting member 2 and the third horizontal slot 62. The free end 70 of arm 69 extends as far as the thin strip 18. The area of the anchoring member 22 facing the free end 70 has an L-shaped recess 71, with the horizontal leg of the "L" being a certain distance above the horizontal extension of the second horizontal slot 59, so as to leave a certain thickness of material in between. The head of a screw 20 is supported against the horizontal leg of the L-shaped recess 71. The screw 20 passes through the horizontal extension of the second horizontal slot 59 and into a thread 72 in the anchoring member 22 on the side of said slot which is farthest from the head of the screw 20. A locking screw 19, parallel to screw 20, is screwed into a thread 73 in the strip of material bounded by and between the horizontal leg of the L-shaped recess 71 and the horizontal extension of the second horizontal slot 59 and the end of screw 19 abuts the anchoring member 22 on the opposing side of slot 59. Thereby an adjusting mechanism is formed whereby the parallelogram to which stress is applied by the thin strips 9, 11, 16, and 18 can be adjusted.

The load column 8 already described with reference to FIGS. 1 and 2 is comprised of an elastic material, for shock damping purposes, and is supported in a receiving piece 24 having its edge region bent upward in conical fashion. The receiving piece 24 is borne by the load-receiving arm 69 near the free end 70 thereof. A detent 21 projecting downward from the underside of the load platform 7 is disposed at a certain distance above the upper edge of the force-transmitting member 2 at the region of member 2 leftward of the L-shaped recess 71, when there is no load on the load platform 7. When an excess load is applied to the load platform, detent 21 comes to abut the upper edge 61 of member 22, i.e. the upper end of anchoring member 22 thereof. In this way, the force-transmitting member 2 is protected against overloading.

The platform scale having the above-described engineering design operates as follows: When an article to be weighed is placed on the load platform 7, the force produced by the weight of the article is transmitted via the four load columns 8 to the load-receiving arms 69 of the load-bearing members 12. The vertical movement produced thereby in the load-bearing members 12, each member 12 being parallelly guided by the link members 10 and 17, in turn produces a rotation of the lever member 14 around the thin strip 13 of each member 2 (shown on the left in FIG. 3) as the fulcrum. The only operative force components are the vertical components acting on the lever member 14. Any horizontal components are absorbed or countered by link members 10, 17 and thus do not result in any torque on member 4. By selection of appropriate force-transmitting arms 5, the ratio between the sum of the forces exerted from the load platform via the load and the force exerted on the force sensor 6 via the coupling device 23 can be established in simple fashion, so that the force measured by the force sensor 6 and transmitted by the device 23 is a direct measure of the load exerted on the load platform 7 by the article to be weighed.

The basic mechanical ratio of the scale is determined by the distance between the thin strips 13 and 15 and by the length of the force-transmitting arm 5. This ratio must be precisely determinable and must not deviate over time. However, in the process of production, variations from product to product will occur within tolerances; accordingly, adjusting mechanism 19, 20 is provided which allows one to vary the height of the parallelogram, i.e. the vertical dimension between the thin strips 18 and 9. The result of such adjustment of the parallelogram is an additional torque on the lever member 14, which torque is a function of the measurement force transmitted and is dependent on the adjustment. The effect of this is the same as if the mechanical ratio of the scale were changed, i.e. the same as if the distance between the thin strips 13 and 15 were changed.

It is clear from the preceding description that the use of the single-piece force-transmitting member 2 enables platform scales to be manufactured which have arbitrary dimensions, but are suitable for high loads. All that is required to accommodate changes in the dimension of the platform is changes in the lengths of the small number, e.g. two, of connecting members. In addition, platforms can be used which are completely independent of the force sensor.

I claim:

1. A platform scale having a load platform for receiving articles to be weighed, a force sensor for generating a measuring signal related to the weight of articles to be weighed, and a lever arrangement supported on a basic frame substantially rectangular in shape in the plane of the frame and having two opposite lateral sides, the plane being parallel to the plane of the load platform, wherein on the input side of the scale the load platform is supported vertically on the lever arrangement for transmitting the force corresponding to the weight of articles to be weighed, and on the output side the lever arrangement is coupled to the force sensor by at least one force-transmitting arm, the improvement in the lever arrangement comprising:

a single-piece force-transmitting member disposed in each corner region of the basic frame, each single-piece force transmitting member comprising an anchoring member attached to a lateral side of the basic frame, a load-bearing member extending substantially parallel and in horizontal spaced relationship relative to said anchoring member, an upper and a lower link member disposed in vertical spaced relationship with respect to each other and between said anchoring member and load-bearing member, thin strip members disposed at the corners of a parallelogram and connecting said link members to said anchoring member and said load-bearing member so that said load-bearing member is supported and guided by said thin strip members and link members for parallel movement relative to said anchoring member, a free inner space between said anchoring member, load-bearing member and link members, a lever member disposed in said free inner space, and two additional thin strip members connecting said lever member to said anchoring member and said load-bearing member;

a connecting member extending along and adjacent to each lateral side of the basic frame and rotationally rigidly coupling together said single-piece force-transmitting members attached to the same lateral side of the basic frame;

a force sensor means between the opposite lateral sides; and a force-transmitting arm connected to each connecting member and extending therefrom toward and in operative engagement with said force sensor means.

2. A platform scale as claimed in claim 1 wherein:
a bore is provided in each lever member;
each connecting member comprises a tubular member; and
each tubular member is attached in said bore of a respective lever member.

3. A platform scale as claimed in claim 1 or 2 and further comprising:
a substantially upwardly extending screw-threaded bore in each anchoring member; and
an adjustable foot member having a screw-threaded shaft threadedly engaging said upwardly extending bore.

4. A platform scale as claimed in claim 1 or 2 and further comprising:
two substantially vertically spaced screw threaded bores in each anchoring member;

mounting bores in said lateral sides of said basic frame aligned with said vertically spaced screw threaded bores; and mounting screws extending through said mounting bores and engaging said vertically spaced screw threaded bores for mounting said single-piece force-transmitting members to said lateral sides of said basic frame.

5. A platform scale as claimed in claim 1 or 2 wherein: said two additional thin strip members extend substantially vertically.

6. A platform scale as claimed in claim 5 and further comprising:

a resilient load column between the load platform and each load receiving arm at a position on each load receiving arm spaced from said load bearing member for supporting the load platform on said single-piece force-transmitting members so that the force of a load on the load platform will be transmitted through said single-piece force-transmitting members, connecting members and force-transmitting arms to said force sensor means.

7. A platform scale as claimed in claim 5 wherein said single-piece force-transmitting member further comprises:

a load receiving arm projecting outwardly from said load bearing member and having a free end disposed in spaced relation to said anchoring member, the load platform being supported on said load receiving arm.

8. A platform scale as claimed in claim 5 wherein said single-piece force-transmitting member further comprises:

a slot extending through said anchoring member for most of the horizontal extent of said anchoring member; and an adjusting means mounted in said anchoring member for adjusting the width of said slot.

9. A platform scale as claimed in claim 3 and further comprising:

a substantially upwardly extending screw-threaded bore in each anchoring member; and an adjustable foot member having a screw-threaded shaft threadedly engaging said upwardly extending bore.

10. A platform scale as claimed in claim 5 and further comprising:

two substantially vertically spaced screw threaded bores in each anchoring member;

mounting bores in said lateral sides of said basic frame aligned with said vertically spaced screw threaded bores; and mounting screws extending through said mounting bores and engaging said vertically spaced screw threaded bores for mounting said single-piece force-transmitting members to said lateral sides of said basic frame.

11. A platform scale as claimed in claim 1 or 2 wherein said single-piece force-transmitting member further comprises:

a load receiving arm projecting outwardly from said load bearing member and having a free end disposed in spaced relation to said anchoring member, the load platform being supported on said load receiving arm.

12. A platform scale as claimed in claim 11 wherein said single-piece force-transmitting member further comprises a slot extending between said upper link member and said load receiving arm and extending substantially from said load bearing member.

13. A platform scale as claimed in claim 11 wherein said single-piece force-transmitting member further comprises:

a slot extending through said anchoring member for most of the horizontal extent of said anchoring member; and an adjusting means mounted in said anchoring member for adjusting the width of said slot.

14. A platform scale as claimed in claim 11 and further comprising:

a substantially upwardly extending screw-threaded bore in each anchoring member; and an adjustable foot member having a screw-threaded shaft threadedly engaging said upwardly extending bore.

15. A platform scale as claimed in claim 11 and further comprising:

a resilient load column between the load platform and each load receiving arm at a position on each load receiving arm spaced from said load bearing member for supporting the load platform on said single-piece force-transmitting members so that the force of a load on the load platform will be transmitted through said single-piece force-transmitting members, connecting members and force-transmitting arms to said force sensor means.

16. A platform scale as claimed in claim 1 or 2 wherein said single-piece force-transmitting member further comprises:

a slot extending through said anchoring member for most of the horizontal extent of said anchoring member; and an adjusting means mounted in said anchoring member for adjusting the width of said slot.

17. A platform scale as claimed in claim 16 wherein said adjusting means comprises:

an adjusting screw having a head thereon abutted against said anchoring member adjacent one side of said slot and a screw thread thereon engaged in a cooperating screw threaded bore in said anchoring member on the other side of said slot; and a locking screw having a screw thread thereon engaged in a cooperating screw threaded bore in said anchoring member on said one side of said slot and an end thereon abutting against said anchoring member on the other side of said slot.

18. A platform scale as claimed in claim 16 wherein said single-piece force-transmitting member further comprises:

a slot extending between said upper link member and said load receiving arm and extending substantially from said load bearing member.

19. A platform scale as claimed in claim 16 wherein: said slot extends substantially from the thin strip member connecting said upper link member to said anchoring member.

20. A platform scale as claimed in claim 19 wherein said adjusting means comprises:

an adjusting screw having a head thereon abutted against said anchoring member adjacent one side of said slot and a screw thread thereon engaged in a cooperating screw threaded bore in said anchoring member on the other side of said slot; and a locking screw having a screw thread thereon engaged in a cooperating screw threaded bore in said anchoring member on said one side of said slot and an end thereon abutting against said anchoring member on the other side of said slot.

* * * * *